US006230876B1

(12) United States Patent
Gilberti et al.

(10) Patent No.: US 6,230,876 B1
(45) Date of Patent: May 15, 2001

(54) INDEXING VACUUM TABLE

(75) Inventors: Joseph J. Gilberti, 45 Long View Rd., Avon, CT (US) 06001; Gary C. Todd, Windsor, CT (US)

(73) Assignee: Joseph J. Gilberti, Avon, CT (US)

( * ) Notice: Subject to any disclaimer, the term of this patent is extended or adjusted under 35 U.S.C. 154(b) by 0 days.

(21) Appl. No.: 09/255,065

(22) Filed: Feb. 22, 1999

(51) Int. Cl.[7] .................................................... B65G 17/46
(52) U.S. Cl. ..................................... 198/803.5; 198/689.1
(58) Field of Search ............................... 414/803.5, 689.1

(56) References Cited

U.S. PATENT DOCUMENTS 3,794,151 * 2/1974 Feasey .............................. 198/803.5
4,188,770 * 2/1980 Tabur ..................................... 53/509
4,719,721 * 1/1988 Stump ........................... 198/689.1 X
4,984,960 * 1/1991 Szarka ........................... 198/803.5 X

* cited by examiner

*Primary Examiner*—Steven A. Bratlie
(74) *Attorney, Agent, or Firm*—Alix, Yale & Ristas, LLP

(57) ABSTRACT

A conveying system for a multicolor screen printer line having a work station for each color has a plurality of work platens which are moved successively through the work stations. Vacuum plenums are provided for holding the work in position on the platens both in the stationary position in the work stations and while the platens are moving and being indexed between stations. This is accomplished by having two sets of vacuum connectors for the platens with these two sets applying the vacuum at different times in the cycle. In one embodiment, there are fixed vacuum connectors at each work station and movable vacuum connectors that reciprocate back-and-forth between work stations. In a second embodiment, there are two sets of movable vacuum connectors with the two sets moving simultaneously in opposite directions.

13 Claims, 15 Drawing Sheets

INDEXING VACUUM TABLE

RELATED APPLICATION

This application is related to pending U.S. patent applications Ser. Nos. 09/255,064 and 09/255,066 having the same filing date and the same inventors as this application.

BACKGROUND OF THE INVENTION

The present invention relates to a conveying system having a plurality of work platens or tables movable through successive work stations and more particularly to vacuum means for holding the work in position on the platens both in the work stations and between work stations. The invention most particularly relates to an indexed multicolor screen printer line having a work station for each color.

It is known in the screen printing art that endless conveyor means containing a plurality of work platforms or platens can be used to move the print substrate on the platens through the various screen printing stations. It is also known that the substrate to be printed can be held on the platens by a vacuum. However, problems are encountered in holding the substrate in an absolutely fixed position on the platen not only while the platens are stationary in each of the printing stations but also while the platens are in motion between stations. One solution found in the prior art is for each platen to have its own vacuum system.

However, these systems are expensive and complicated.

Another problem is that such multicolor printers have a fixed configuration with a fixed number of printing stations printing a fixed number of colors. If additional colors are to be printed, the work must be run again through the same or a different printer having the additional colors. This greatly limits productivity.

SUMMARY OF THE INVENTION

The object of the present invention is to provide a conveying apparatus for moving a series of work platens each holding a work piece through a series of work stations including means for maintaining the work pieces in a fixed position on the platens. A further object is to provide a modular arrangement whereby the number of work stations can be easily selected and changed including concomitant changes in the means for maintaining the work piece positions.

In the present invention, an endless conveyor having a series of work platforms or platens intermittently moves each of the platens to each of a series of work stations. A vacuum is used to hold the work pieces on the platens. More specifically, in one embodiment, a series of fixed vacuum ports connects the platens to the vacuum when the platens are at rest in each work station and a series of movable vacuum ports connect the platens to the vacuum as the platens are moved from one work station to the next. The vacuum sources are switched between the movable and fixed ports as the conveyor is moved and stopped. The series of movable vacuum ports can be driven by a single drive and connected to each other in a modular mode. In a second embodiment, a series of first vacuum ports moves forward and applies the vacuum as the platens are indexed forward. Simultaneously, a series of second vacuum ports moves rearward to be ready for the next cycle.

DESCRIPTION OR THE PREFERRED EMBODIMENT

Figure 1:
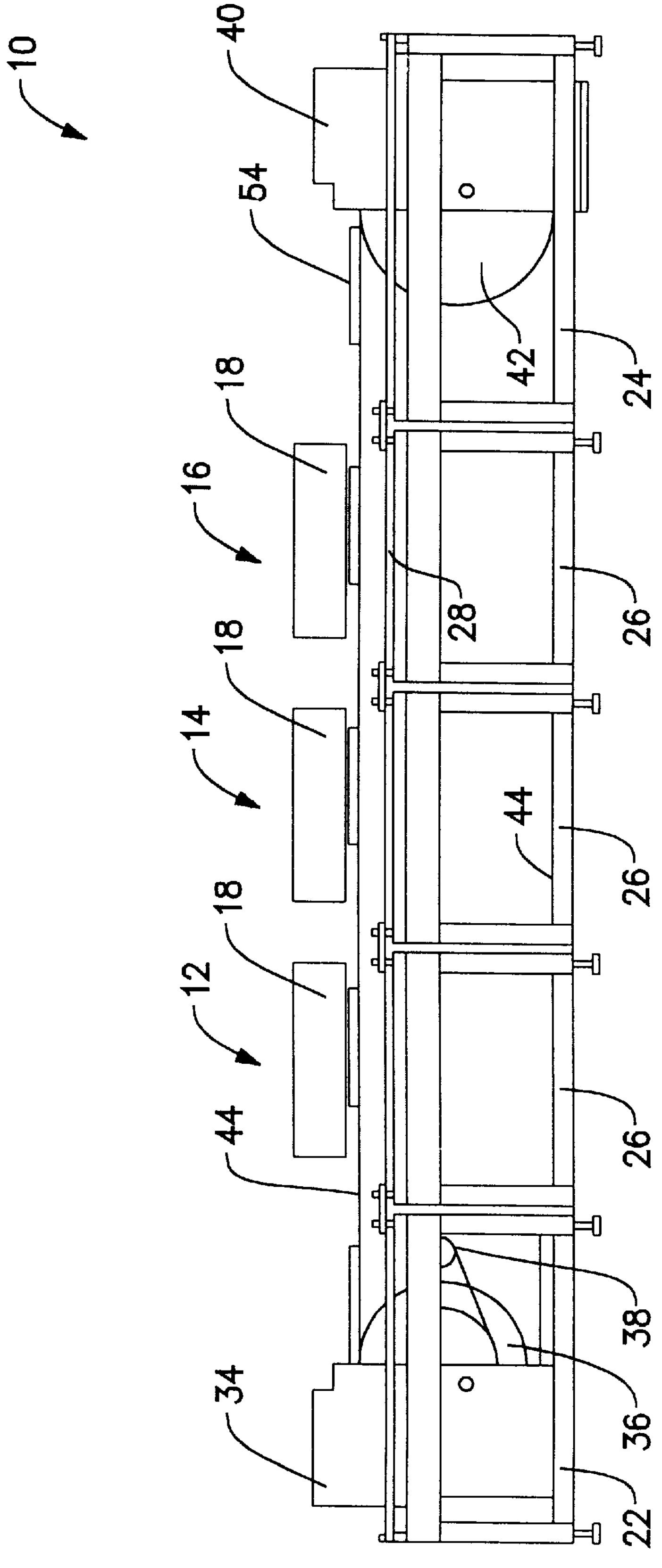
FIG. 1 is a front elevation view of a screen printing apparatus according to the present invention.

The present invention relates to a conveying system for moving work pieces through a series of work stations. Although the system can be employed for performing various types of work on the work pieces at each station, the invention is particularly suited for use in a multicolor screen printer line where each work station has a screen printer for one of the multicolors. Therefore, the invention will be described with various references to that particular use of the invention recognizing that other uses are just as viable and within the scope of the invention.

The apparatus of the invention includes a plurality of frame sections which are detachably coupled together to form a linear path. A plurality of printing stations are located along the linear path, with each printing station being located on one of the frame sections. A printer would be located at each printing station for printing a selected one of the plurality of colors on a substrate during a printing operation.

The apparatus includes a feed mechanism supported on the frame sections. The feed mechanism comprises a plurality of detachably connected segments, with each segment being dimensioned to correspond to a respective one of the frame sections. A plurality of platens are supported on the feed mechanism and are indexed by the feed mechanism along the linear path to sequentially position each platen at a respective one of the printing stations. Each platen defines a support surface for supporting a substrate and also defines a vacuum plenum which is in fluid communication with the support surface. A vacuum system is provided for applying vacuum at the support surface to hold the substrate in a fixed position on the support surface as the platens are being indexed along the path and when the platens are in position at the printing stations during a printing operation.

The individual frame sections, corresponding feed mechanism segments, printing stations and platens are assembled together as modular units. The apparatus can be configured with any number of modular units depending on the number of different colors that a particular printing job requires. This is accomplished simply by coupling the frame sections together and connecting the feed mechanism segments of the individual units together to provide an in-line arrangement of the desired number of modular units, each of which is capable of printing a different color. Since, as noted above, the frame sections are detachably coupled together and the feed mechanism segments are detachably connected, modular units can easily be added or removed to reconfigure the apparatus for printing any number of different colors.

The feed mechanism comprises an endless loop conveyor having an upper run which extends along the linear path. The conveyor includes a drive chain mounted on a pair of sprockets, each supported on a frame section located, respectively, at opposite ends of the linear path, and a drive motor connected to one of the sprockets for driving the chain. The platens are coupled to the drive chain and are supported on a track which is mounted on the frame sections and extends around the endless loop. The drive chain includes a plurality of chain segments which are detachably connected together. Chain segments can be added or removed to provide the drive chain with the required length. The track on which the platens are supported as they are conveyed around the endless loop also comprises a plurality of detachably connected segments. As in the case of the drive chain, track segments are added or removed according to the number of frame sections coupled together in each particular configuration of the apparatus. The vacuum system includes a plurality of stationary vacuum connectors and a plurality of movable vacuum connectors. Each stationary connector is supported in a fixed position on the apparatus and is associated with a respective one of the printing stations. Each stationary connector provides fluid communication between a vacuum source and the vacuum plenum of the particular platen positioned at the associated printing station during a printing operation. Each movable vacuum connector is mounted on the apparatus for synchronous movement with a respective one of the platens as the platen is indexed along the linear path between printing stations.

FIG. 1 of the drawings is a front elevation view showing the general overall arrangement of the modular multicolor screen printer 10 of the invention and illustrating three work stations generally designated 12, 14 and 16. At each work station is a screen printer 18 with each one adapted to screen print a different color on a work piece. Of course, the fact that three work stations 12, 14 and 16 and three screen printers 18 are illustrated is only by way of example and there can be as many stations and printers as desired for printing with fewer or more colors. As will be clear from the continuing description of the invention, the modular aspects of the conveyor system are particularly useful in changing the number of work stations.

Figure 2:
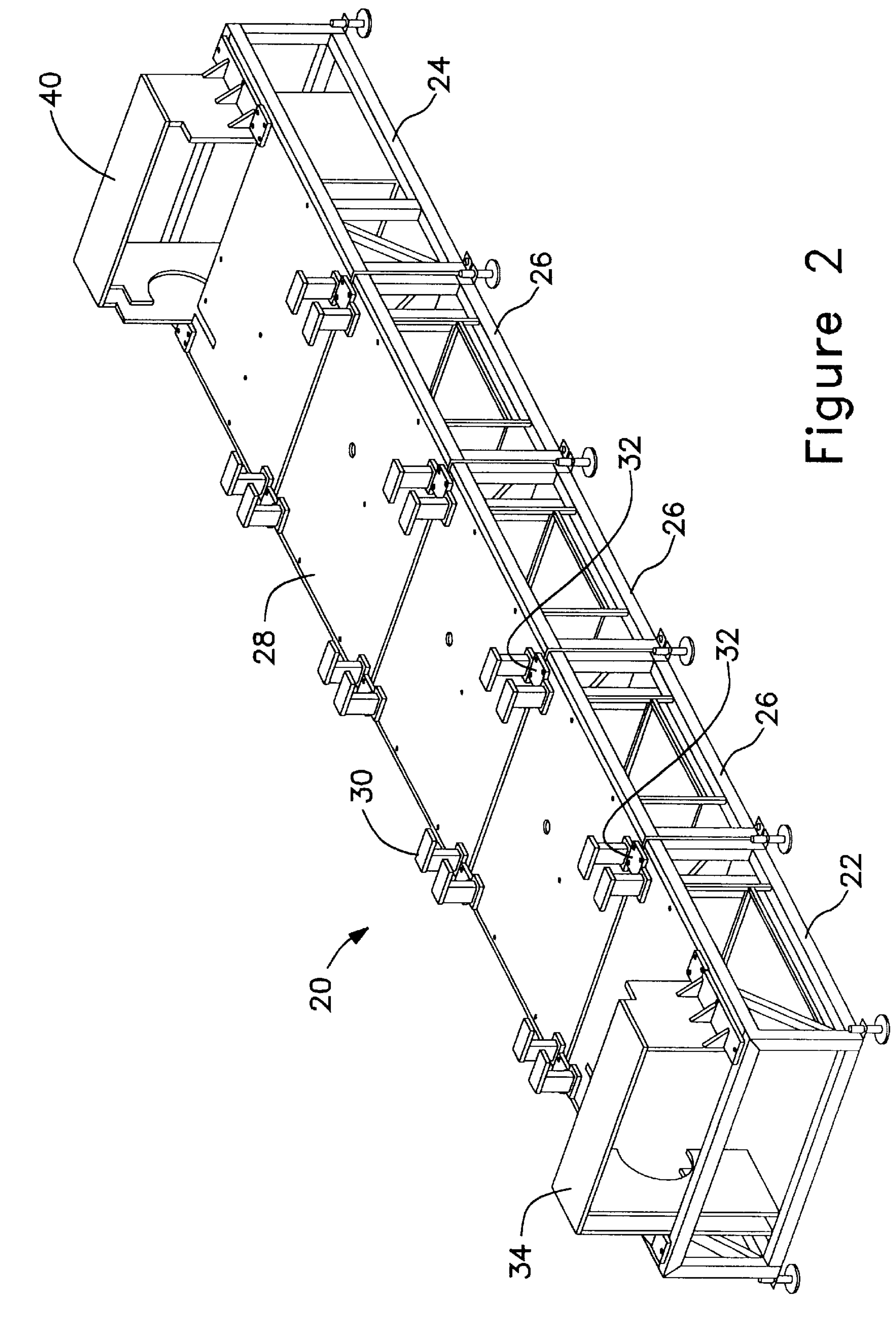
FIG. 2 is a perspective view of the assembled modular frame sections which forms the base of the apparatus.
Figure 3:
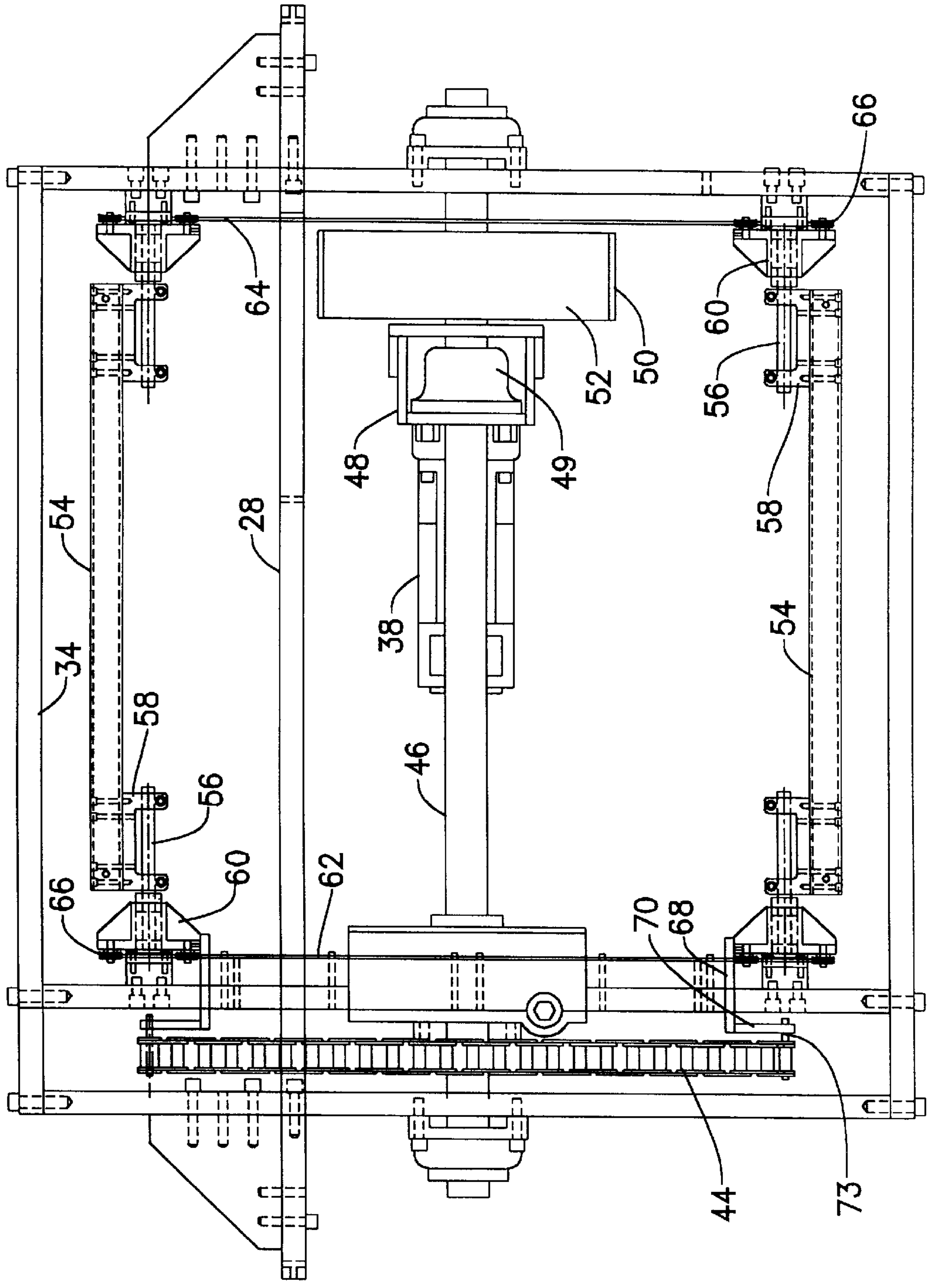
FIG. 3 is an end view showing the chain conveyor mechanism with the work support platens attached to the chain and supported for movement.
Figure 4:
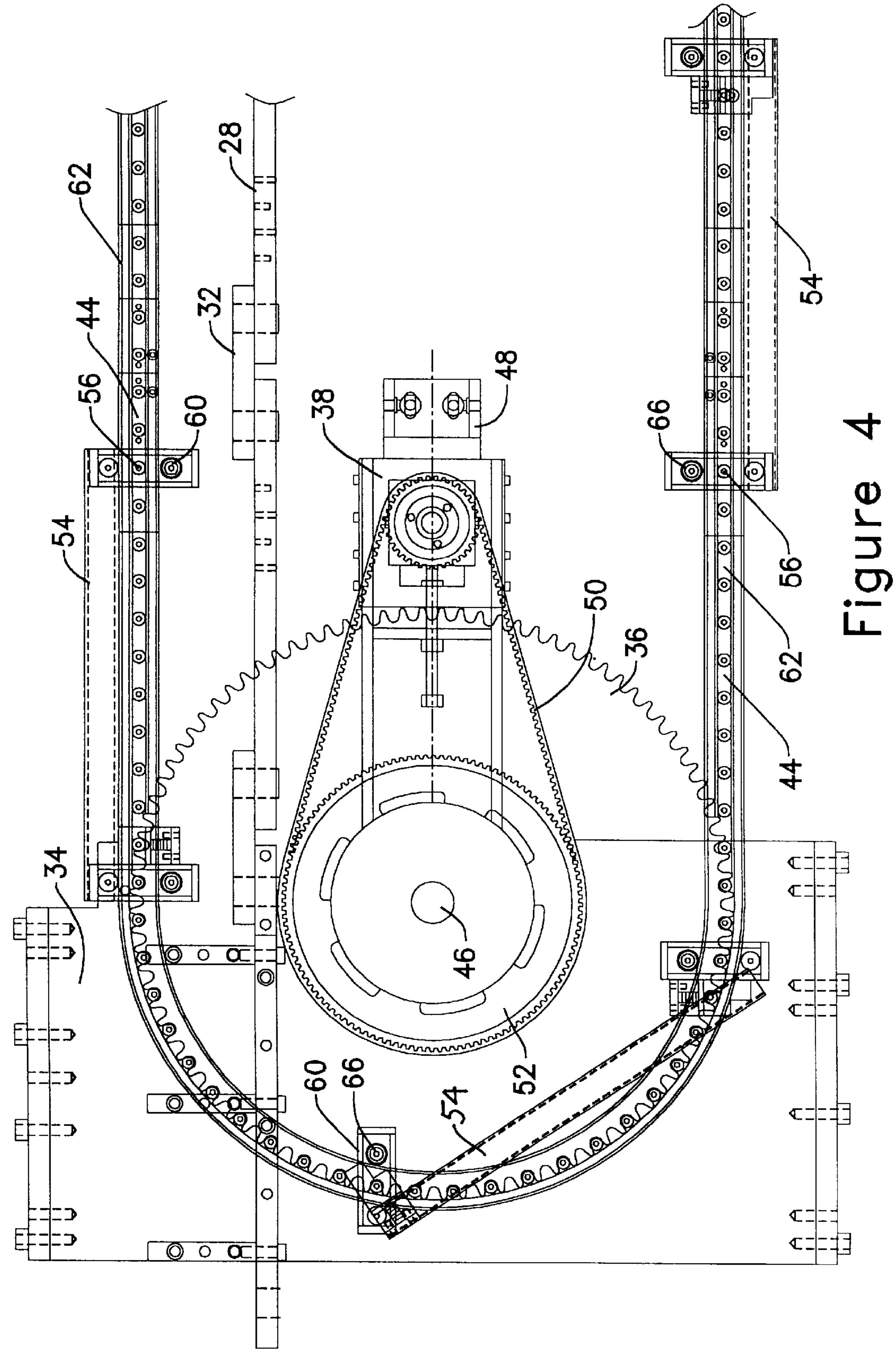
FIG. 4 is a side elevation view of a portion of the chain conveyor mechanism of FIG. 3 showing the sides of the platens.

Referring now to FIGS. 2, 3, and 4 in conjunction with FIG. 1, the base 20 of the conveyor system is an arrangement of modular units which comprises the two end units 22 and 24 and the three work station units 26. Each unit comprises a base framework and a top support plate 28. Each of these units are separate modules which are fastened together to form the base 20. This is shown by the tie plates 32. The number of printing stations may be changed by adding or subtracting work station units. The brackets 30 are for mounting the conveyor track described below. The end unit 22 contains the conveyor drive housing 34, drive sprocket 36 and drive motor 38 and the end unit 24 contains the conveyor idler housing 40 and idler sprocket 42. The screen printers 18 are supported by independent floating carriers which are not shown.

Referring now particularly to FIGS. 3 and 4, a chain 44 goes around the drive sprocket 36 and the idler sprocket 42 (FIG. 1) to form the endless conveyor drive. The drive sprocket 36 is mounted on the shaft 46 which is mounted in the conveyer drive housing 34. The drive motor 38 is mounted on the motor bracket 48 attached to the base frame and also to the drive shaft 46 via the pillow block 49. The drive belt 50 from the drive motor to the pulley 52 drives the shaft 46 and the drive sprocket 36.

Also shown in FIGS. 3 and 4 are the platens 54 which are rotatably mounted at each corner by the axle shafts 56 extending through the platen support brackets 58 and the platen mounting brackets 60. The platen mounting brackets 60 are movably mounted on the tracks 62 and 64 by the rollers 66 which are grooved to ride on the tracks 62 and 64. The tracks 64 on the front and 62 on the rear each extend along the top of the platen path, around the ends and along the bottom of the platen path to form the continuous tracks. The bars 68 are attached to the platen mounting brackets 60 and extend past and to the outside of the track 62 to a point adjacent the chain 44. The bars 68 are attached to the chain 44 by means of the rods 70 and pins 73 which are suitably attached to the chain 44.

Figure 5:
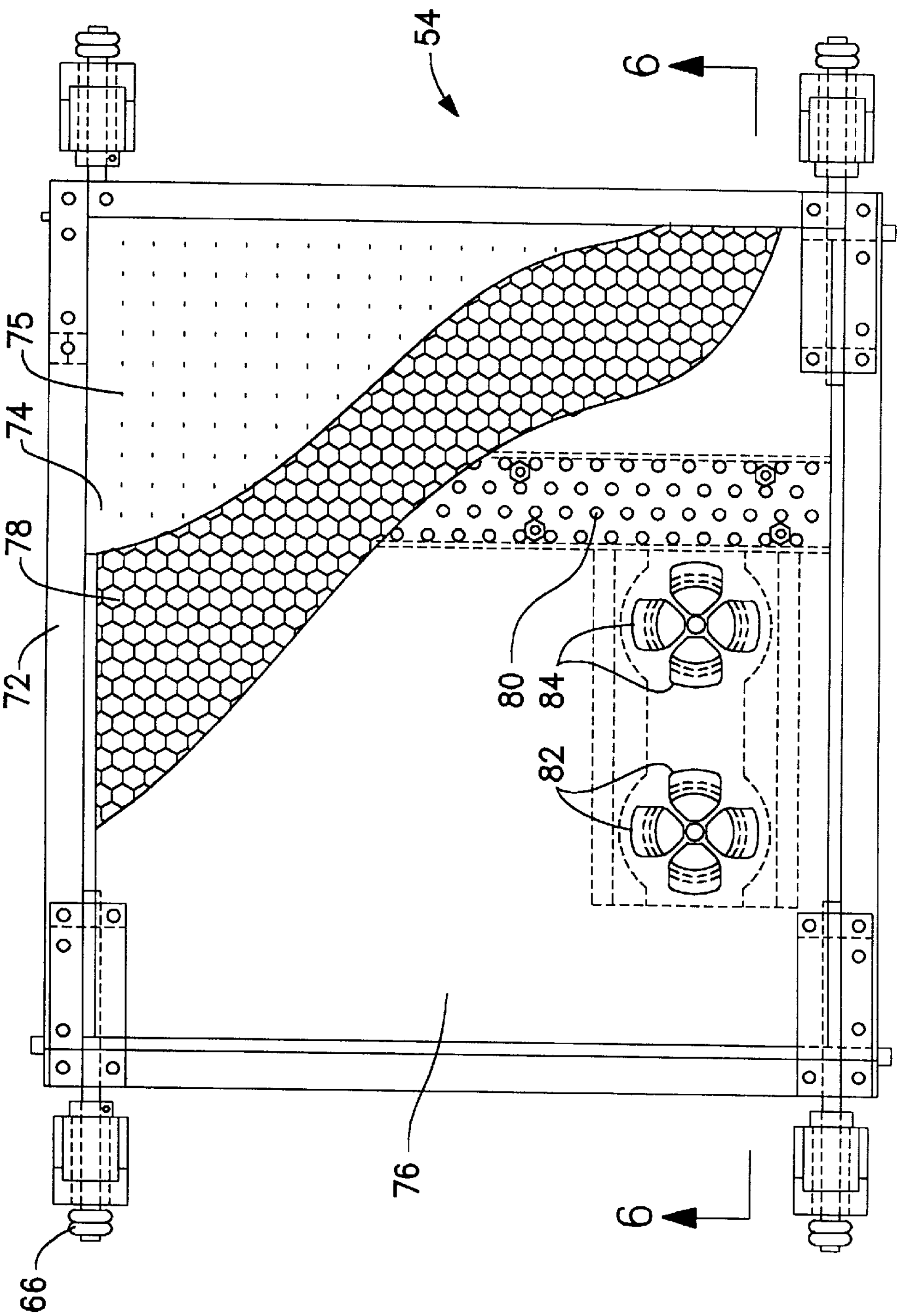
FIG. 5 is a top view of a single platen cut away to illustrate the structure and the vacuum arrangement.
Figure 6:
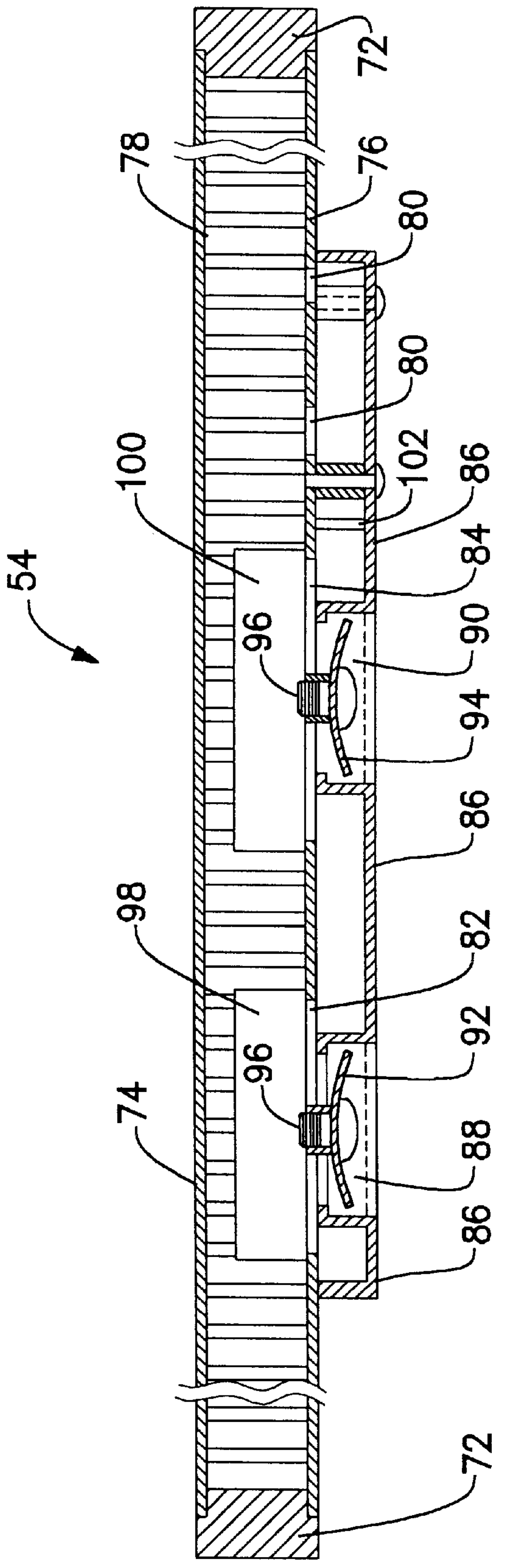
FIG. 6 is a cross section of a portion of the platen of FIG. 5 illustrating the details of the attachment of the vacuum manifold to the platen and the vacuum flow path.

The platens 54 which support the substrate or work piece on which the printing takes place include the means for applying a vacuum to the support surface of the platen to hold the substrate in position. FIG. 5 is a top view of one of the platen assemblies with a portion of the top surface and core of the platen cut away to show a top view of a portion of the bottom surface of the platen. FIG. 6 is a partial cross-section view taken along line 6—6 of FIG. 5 but showing the core and top surface in place.

Each platen 54 comprises a frame 72, a porous top surface 74 fastened in the frame, a bottom surface 76 fastened in the frame and a rigid core 78 with flow passages as described later in relation to FIG. 8. The porous top surface 74 is preferably a plate with perforations 75 and the rigid core 78 is preferably a honeycomb structure for rigidity. A plurality of holes 80 extending across the bottom surface 76.

These holes 80 are for the purpose of distributing the vacuum rapidly over the entire platen as will become evident.

In the bottom surface 76 of each platen 54 are two sets of openings 82, 84. These sets of openings 82 and 84 are for the purpose of applying the vacuum to the platen 54 as will become apparent. The set of openings 82, 84 are specifically for applying the vacuum when the platen 54 is at rest in a printing station while the openings 84 are for applying the vacuum when the platen 54 is in motion between printing stations as will also be apparent from the description which follows. Another embodiment is described later.

Figure 7:
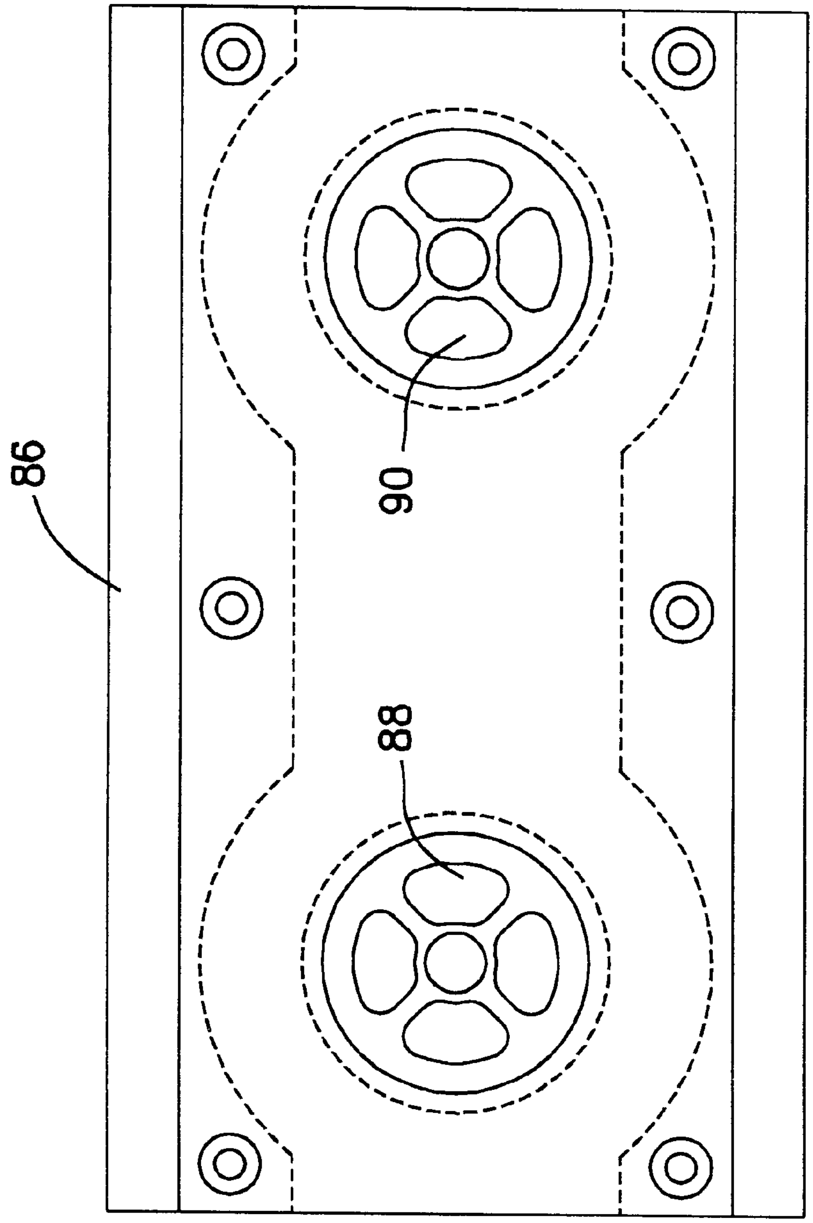
FIG. 7 is a bottom view of the vacuum manifold of FIG. 6.

Attached to the bottom face of the bottom surface 76 over the openings 82 and 84 is a manifold 86 shaped as shown in FIGS. 6 and 7. This manifold 86 is also shown in phantom in FIG. 5 below the bottom surface 76. The manifold 86 contains a pair of diaphragm valves 88 and 90 containing the diaphragms 92 and 94 secured in place by respective bolts 96. The bottom view of the manifold 86 in FIG. 7 has the diaphragms 92 and 94 omitted for clarity. Adjacent the valves 88 and 90, the ridgid core 78 has cutouts 98 and 100 to form a flow path for drawing the vacuum. In addition to the manifold 86, a cover 102 is attached to the bottom surface 76 to cover the holes 80. This cover 102 forms a flow chamber 104 which is in fluid communication with the holes 80, the manifold 86 and the valves 88 and 90. Applying a vacuum to either of the valves 88 or 90 will draw a vacuum in the manifold 86, the cutouts 98 and 100, the flow chamber 104, the holes 80, up into rigid core 78 and through the holes 75 in the porous top surface 74.

Figure 8:
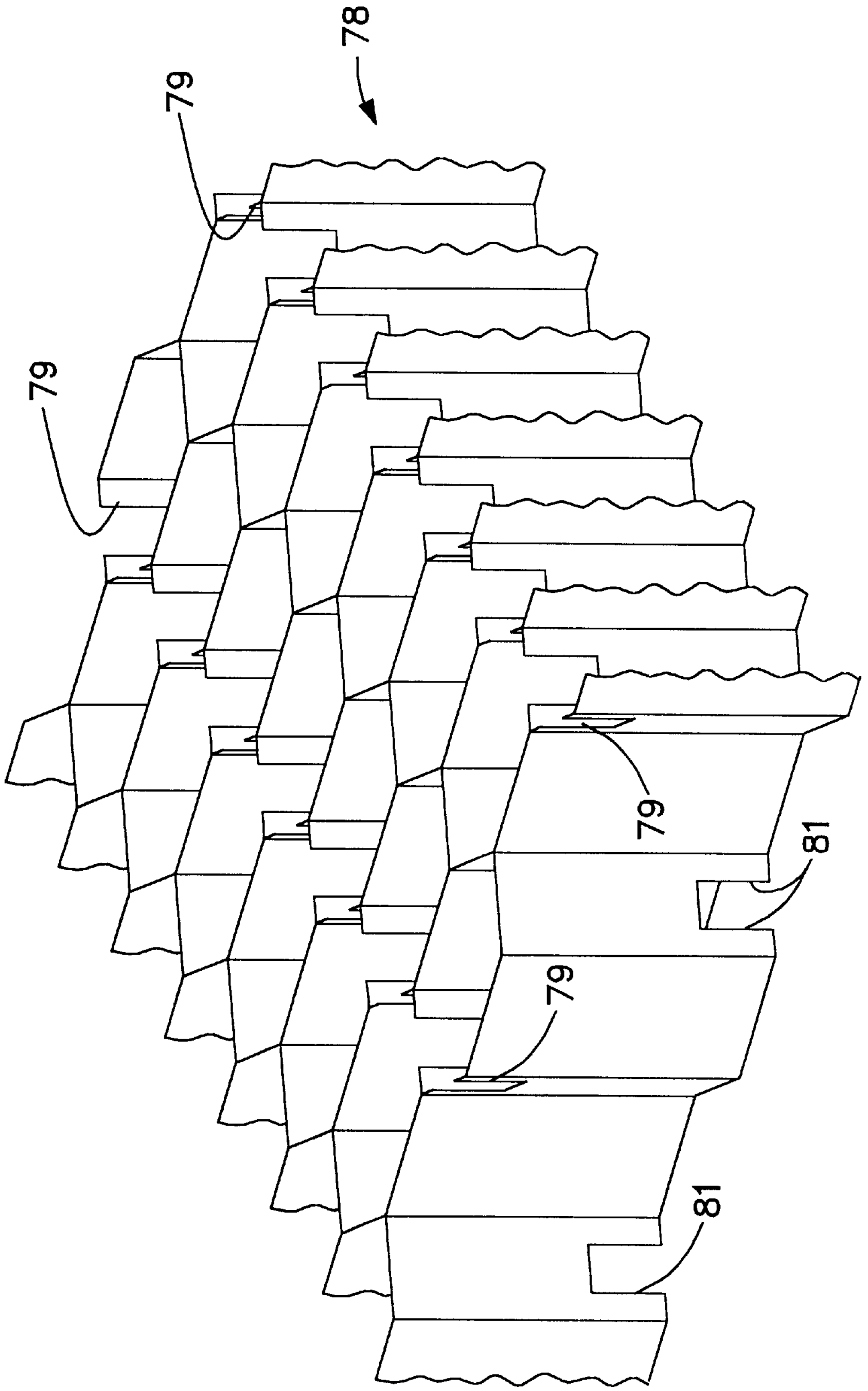
FIG. 8 is a perspective view of a portion of the honeycomb cell structure showing the notches which permit air flow between cells.

FIG. 8 illustrates the flow passages which facilitate the flow of air within the honeycomb cell structure and assure a uniform vacuum over the platen surface. As can be seen, there are rows of notches cut into the sides of the cells at both the top edges at 79 and the bottom edges at 81. The arrangement of notches shown in this FIG. 8 is preferred but other arrangements of notches or other flow passages between cells could be used.

Figure 9:
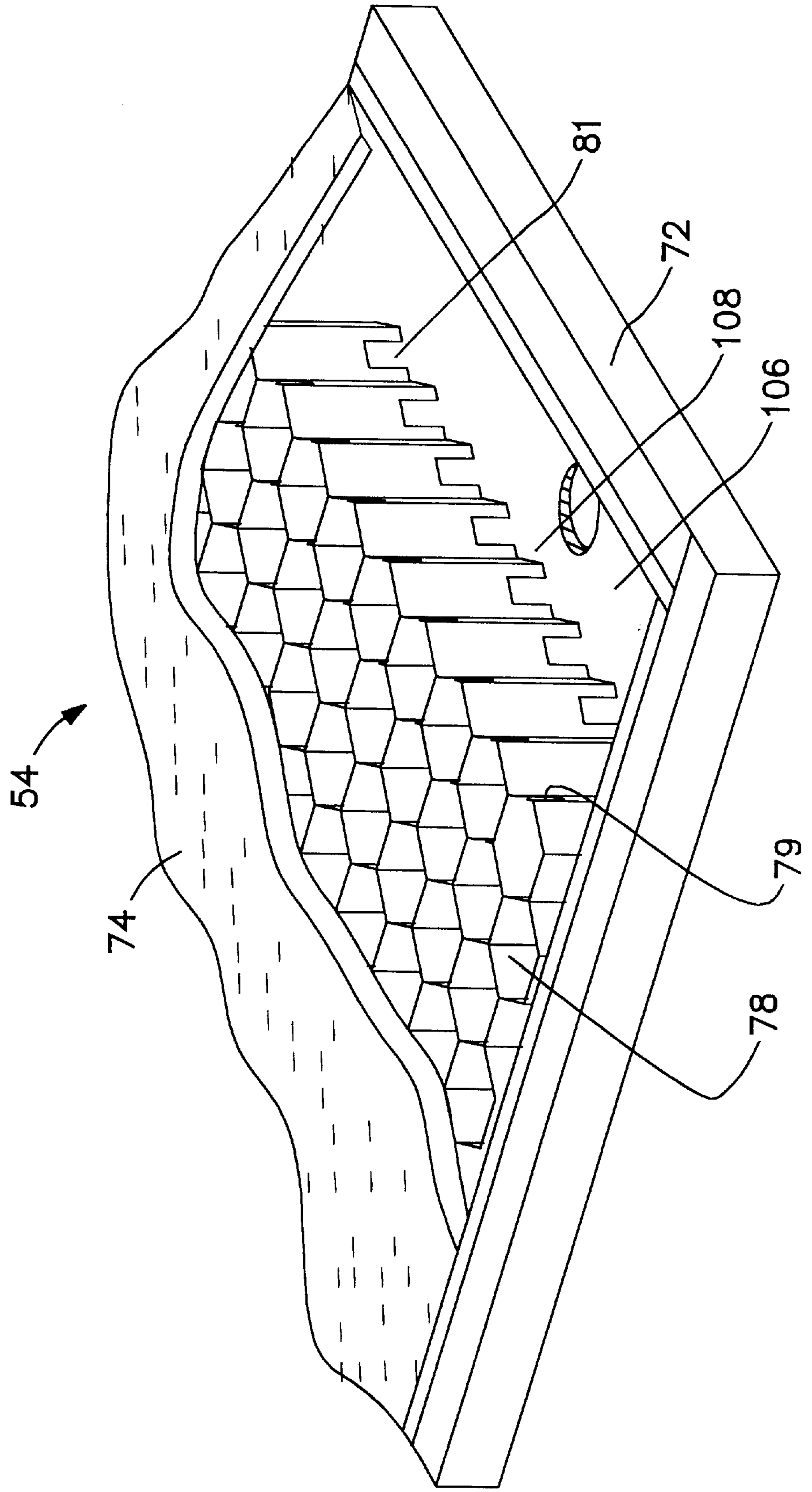
FIG. 9 is a perspective view of an alternate platen arrangement.
Figure 10:
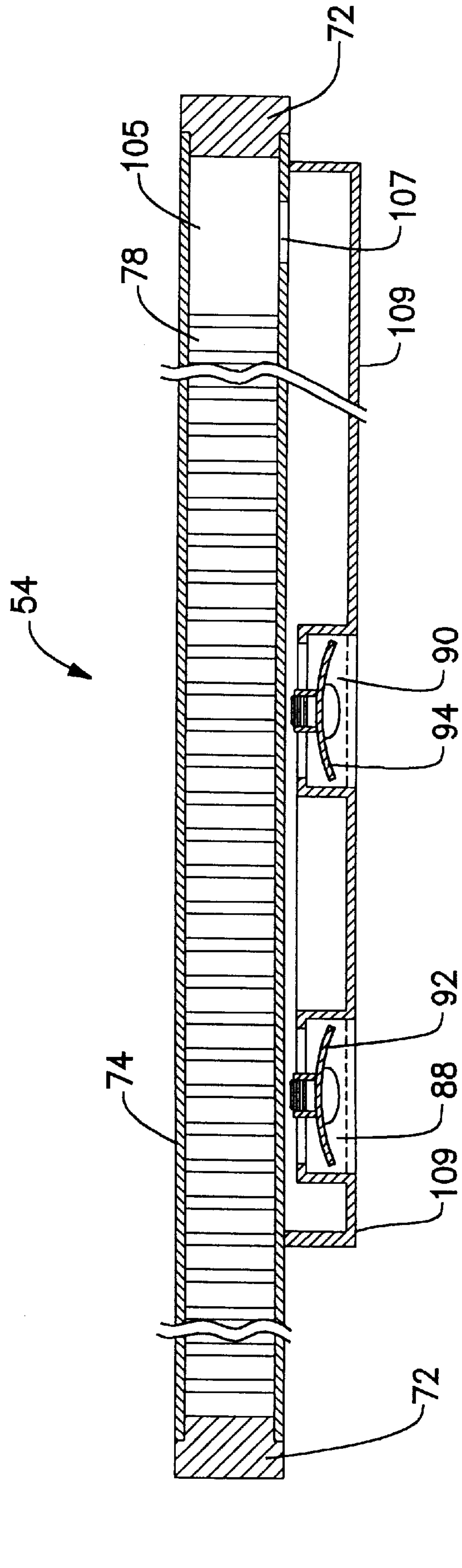
FIG. 10 shows the vacuum manifold attached to the bottom of the platen of the FIG. 9 embodiment.

FIGS. 9 and 10 show an alternate embodiment of the platen 54 of the invention. In this embodiment, the rigid core 78 terminates or is cut back a short distance from one edge of the platen. This distance of perhaps on the order of 1.5 inches forms a flow chamber 105 internal to the platen 54. In the bottom of this flow chamber 105 is the aperture 107 which connects the flow chamber 105 to the vacuum manifold 109 attached under the bottom of the platen 54 as shown in FIG. 10. The vacuum manifold 109 has the same two diaphragm valves 88 and 90. In this embodiment, the manifold 109 is spaced further down from the bottom face of the platen 54 thereby eliminating the need for the cutouts 98 in the rigid core 78 which could also be done with the FIG. 6 embodiment. The manifold log covers the aperture 107.

Figure 11:
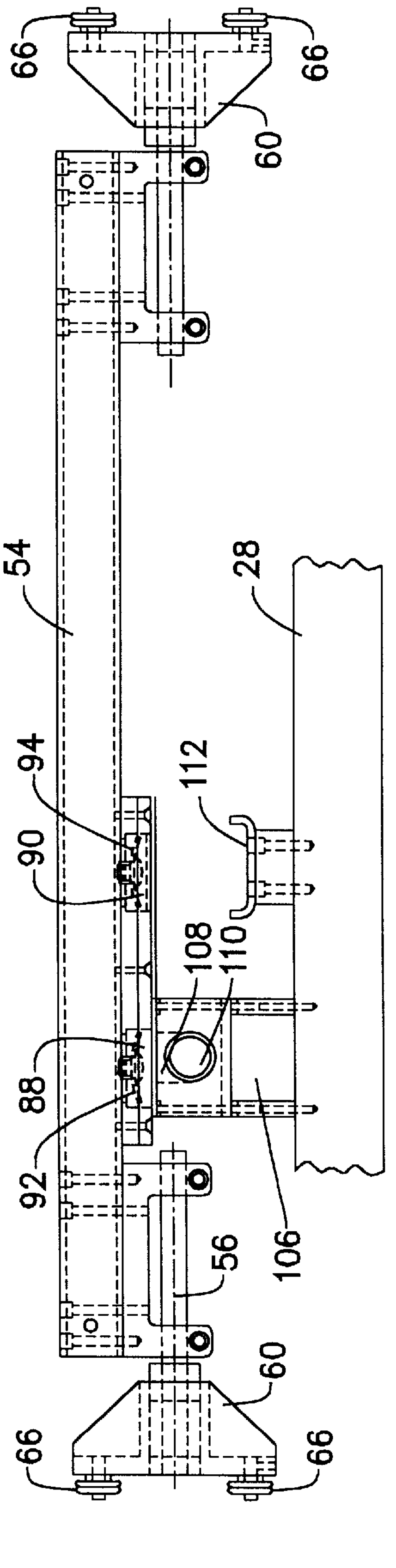
FIG. 11 illustrates the stationary vacuum connector in relation to the vacuum manifold on the platen.

FIG. 11 shows an end view of one of the platens 54 with the diaphragm valves 88 and 90 exposed. A fixed vacuum connector 106 is suitably mounted on the base such as oh the top support plate 28 at each printing station. This FIG. 8 shows a platen 54 in a stationary position at a printing station and shows that the fixed vacumm connector 106 is in close proximity to the diaphragm valve 88. The fixed vacumm connector 106 is basically a block with an internal passageway 108 opening through the top and the side and with a hose connection 110 on the side. When a vacuum is drawn on the fixed vacuum connector 106, the diaphragm 92 will be drawn down to the open position so that the vacuum is drawn on the platen as explained earlier. Drawing the vacuum in this position will pull the diaphragm 94 up to the closed position due to atmospheric pressure. There is one of these fixed vacumm connectors 106 at each of the printing stations. This FIG. 11 also shows the track 112 for the movable vacuum connectors 114.

Figure 12:
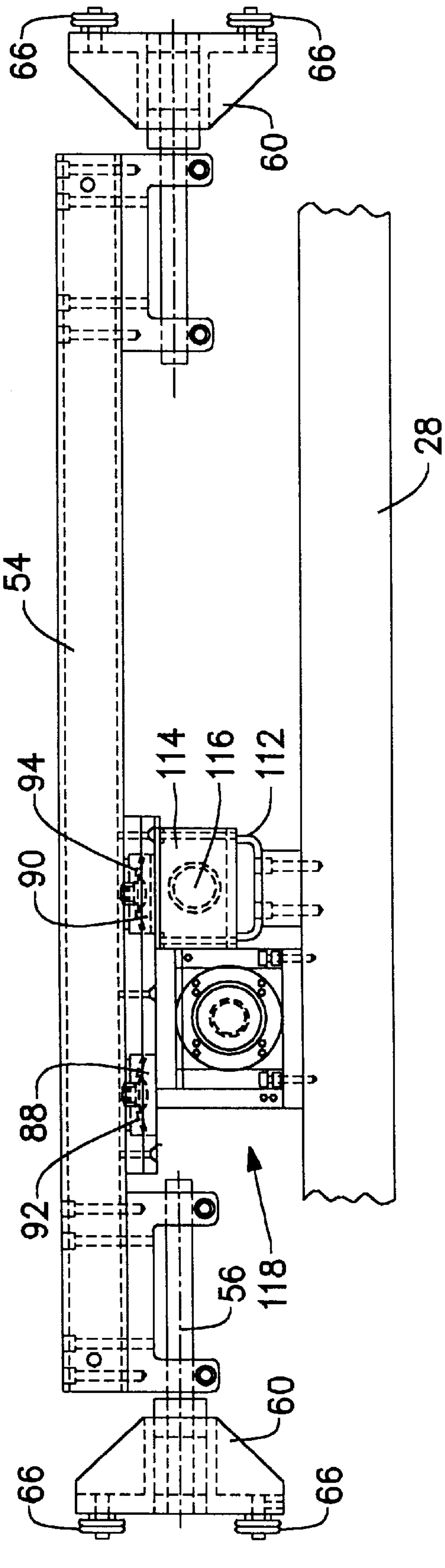
FIG. 12 illustrates the movable vacuum connector in relation to the vacuum manifold and shows the drive for the movable vacuum connectors.

FIG. 12 shows an end view of one of the movable vacuum connectors 114 on the track 112 for movement along the path of the platens 54. As can be seen, this movable vacuum connector 114 lines up with the diaphragm valve 90. When a vacuum is drawn on the hose connector 116, the diaphragm 94 is pulled down into the open position thereby drawing a vacuum on the platen 54 and holding the diaphragm valve 88 closed. There is one of these movable vacuum connectors located for movement between each of the adjacent pairs of work stations. This FIG. 12 also shows an end view of the drive mechanism, generally designated 118, for the movable vacuum connectors 114.

Figure 13:
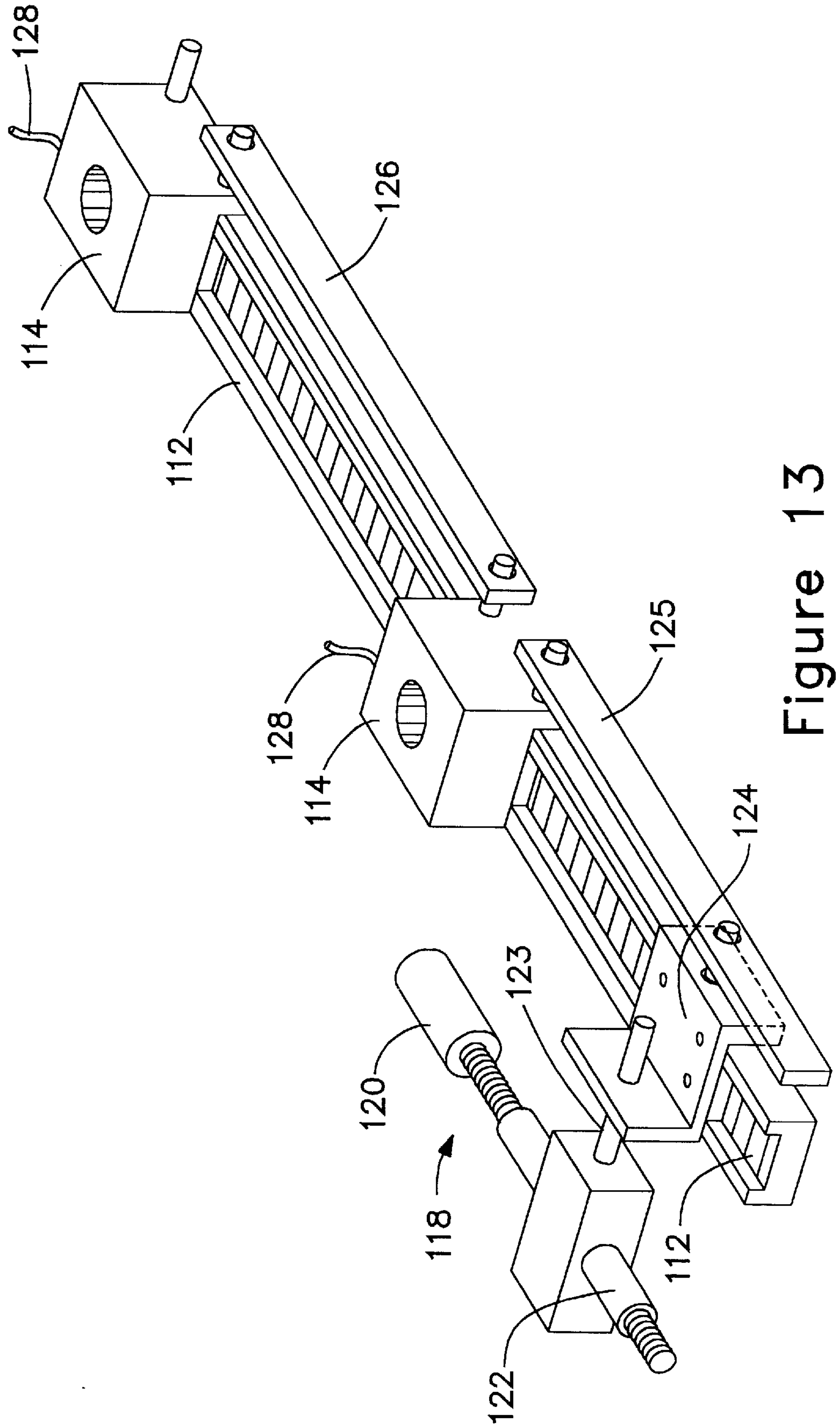
FIG. 13 is a perspective view of the drive mechanism for the plurality of movable vacuum connectors.

FIG. 13 is a perspective view showing the drive mechanism 118 and a plurality of the movable vacuum connectors 114 each mounted on the track 112 and tied to each other and to the drive mechanism 118. The preferred drive mechanism 118 comprises the servo motor 120 and the ball-screw mechanism 122. The ball-screw mechanism 122 is tied by the pin 123 to the driver slide 124 on the track 112. The link rods 125 and 126 link the driver slide 124 and the movable vacuum connectors 114 together so that they move simultaneously. The link rods 125, 126 allow the entire train of connectors to articulate slightly up and down to accommodate surface irregularities. In keeping with the modular design, the track 112 is formed in sections corresponding to the conveyor modules. The servo motor 120 is connected so as to be activated when the conveyor is activated to move the platens. The servo motor and ball-screw drive the movable vacuum connectors at the same rate as the platens are moved by the conveyor so that the movable vacuum connectors 114 remain adjacent to the diaphragm valves 90. FIG. 13 also shows the vacuum hoses 128 connected to the movable vacuum connectors. Although a ball-screw drive has been illustrated and is preferred, other types of drives can be used.

Figure 14:
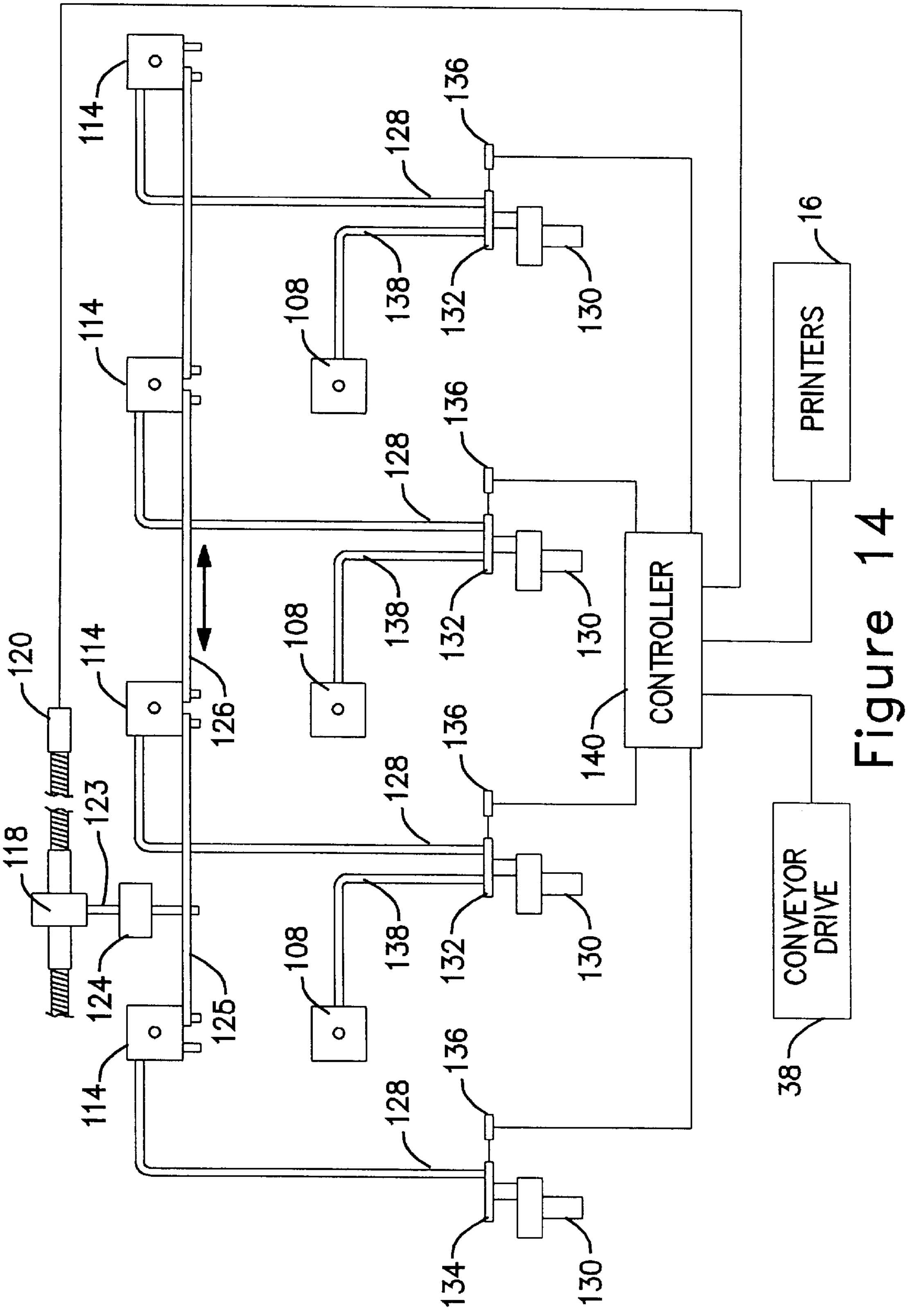
FIG. 14 diagrammatically illustrates the control system and the connections between vacuum pumps and the fixed and movable vacuum connectors including valving means for switching between the connectors at the proper intervals.

FIG. 14 diagrammatically illustrates the vacuum system and the control system of the invention for a three color printer. In the preferred embodiment, there is a vacuum pump 130 for each of the movable vacuum connectors 114 so that each module's vacuum is independent. Therefore, if any platen does not have a substrate (paper, etc.) in place as can happen for various reasons, there will not be any pressure drop over the remainder of the system as would occur with only one vacuum pump. Also, a failure of one vacuum pump will not disable the entire system. Connected to the vacuum pumps 130 are the multiport valves 132 and 134. Each valve 132, 134 has an actuators 136. The multiport valves 132 are four-way valves adapted to connect the vacuum to the movable vacuum connectors 114 via vacuum hoses 128 or the fixed vacuum connectors 106 via lines 138. The valve 134 is a three-way valve since it is only connected to a vacumm connector 114. Each multiport valve 132 is adapted to connect the vacuum to either the line 128 or the line 138 or to connect these lines to the atmosphere to allow air to quickly flow back in to release the vacuum. The valve 134 either applies the vacuum to the vacumm hose line 128 or allows air to enter the vacumm hose 128. The controller 140 shown in this FIG. 14 properly sequences the multiport valves 132 and 134 to apply and release the vacuum, the servo motor 120 to move the connectors 114, the drive motor 38 to move the platens 54 and the printers 18. During a printing step, the valves are postioned to apply the vacuum to the fixed vacumm connectors 106 and to open the moveable vacumm connectors 114 to the atmosphere. When a printing step is completed, the conveyor drive motor 38 and the servo-motor 120 reverse the valve positions. In this condition, the platens are moving between printing stations along with the movable vacuum connectors 114. Therefore, the vacuum is maintained on the platens 54. When the platens 54 have reached the next position, the drive motor 38 is turned off and the valve positions are reversed. At the same time, the servo motor is reversed in direction so that the movable vacuum connectors 114 are returned to their starting positions ready for the next cycle.

Figure 15:
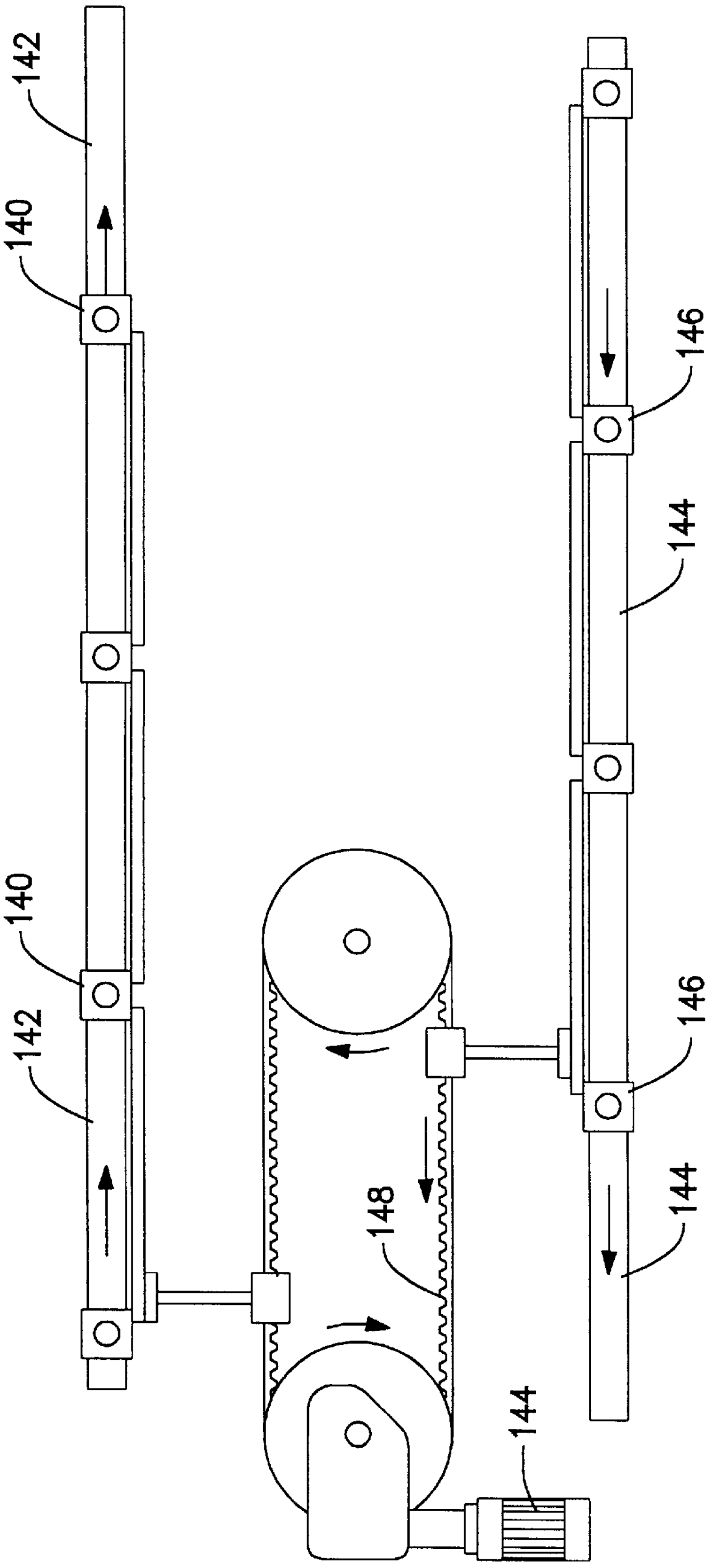
FIG. 15 shows an alternate embodiment of the invention wherein all of the vacuum connectors are movable and reciprocate along a dual track system.

FIG. 15 shows a modified arrangement of the invention in which there are no fixed vacuum connectors at each of the printing stations. Instead, all of the vacuum connectors are moveable and comprise a dual reciprocating arrangement. In this arrangement, there are two tracks 142 and 144 and two sets of moveable vacuum connectors 146 and 140. The two sets of connectors are attached to the opposite sides of the timing belt 148 driven by the servo motor 150. When the servo and timing belt are activated, the two sets of connectors move in opposite directions. The operation would begin with a first set of connectors in an advanced position with the connectors each at a printing station with the vacuum applied. The vacuum would be off to the second set of connectors. As the printing step is completed, the vacuum connectors would be reversed, the servo motor and timing belt would advance the second set of connectors along with the advancement of the platens and the first set of connectors would be moved backwards to be ready for the next cycle. With this system, there is no time lost by the need to move the moveable connectors back to a starting position during a printing step. Such movement becomes a limitation on the cycle time. But when the connectors are all moving at the same time, there is no lost cycle time.

What is claimed is:

1. An apparatus for sequentially performing a series of work steps on a work piece, said apparatus comprising:

a plurality of modular work stations arranged in spaced relationship along a linear path, each work station including means for performing one of said work steps on the work piece;

a feed mechanism for indexing a plurality of platens supported on the feed mechanism along the linear path to sequentially position each platen at a respective one of the work stations, each platen defining a support surface for supporting the work piece, said support surface including a vacuum plenum, the support surface being in fluid communication with the vacuum plenum; and a vacuum system for applying vacuum at each support surface to hold the work piece in a fixed position on the support surface when the platens are indexed along the linear path and during the work steps, the vacuum system including:

a vacuum source, a plurality of stationary vacuum connectors, each stationary connector being supported in a fixed position on the apparatus and being associated with a respective one of the work stations for providing fluid communication between the vacuum source and the vacuum plenum in the platen during the work step, a plurality of movable vacuum connectors, each movable connector mounted on the apparatus for synchronous movement with a platen as the platen is indexed between work stations along the linear path, the movable connector providing fluid communication between the vacuum source and the plenum as the platen is indexed along the linear path, and a vacuum valve selectively operable to permit fluid communication between the vacuum source and each plenum through the plurality of fixed connectors during the work steps and to permit fluid communication between the vacuum source and each plenum through the plurality of movable connectors as the platens are indexed along the linear path, and an operating mechanism to index the plurality of movable vacuum connectors synchronously with the plurality of platens.

2. The apparatus of claim 1, wherein the operating mechanism reciprocates at least some of said movable connectors in a forward and rearward direction between two workstations disposed consecutively along the linear path, said at least some of said movable connectors being synchronously moved in the rearward direction during the work steps.

3. The apparatus of claim 2, wherein the operating mechanism comprises a track supported on the apparatus and extending along the linear path for supporting the plurality of movable vacuum connectors, a drive member coupled to each movable vacuum connector, and a drive motor drivingly connected to the drive member to reciprocate the plurality of movable vacuum connectors along the track in the forward and rearward directions.

4. The apparatus of claim 3, wherein the platen has an upper wall defining the support surface, and a lower wall, the plenum being disposed between the upper and lower walls and comprising an air permeable core, and the upper wall defining a plurality of apertures providing fluid communication from the core to the support surface.

5. The apparatus of claim 4 further comprising a manifold supported on the lower wall and defining first and second vacuum ports each having an associated diaphragm movable between open and closed positions in response to a vacuum applied by the vacuum source, one of the first and second ports providing a fluid connection between the fixed vacuum connector and the plenum during the work operation, and the other of the first and second ports providing a fluid connection between the movable vacuum connector and the plenum as the platen is indexed between work stations.

6. An apparatus for sequentially performing a series of work steps on a work piece, said apparatus comprising:

a plurality of work stations arranged in spaced relationship along a linear path, each work station including means for performing one of said work steps on the work piece;

a feed mechanism for indexing a plurality of platens supported on the feed mechanism along the linear path to sequentially position each platen at a respective one of the work stations, each platen defining a support surface for supporting the work piece and a vacuum plenum, the support surface being in fluid communication with the vacuum plenum; and a vacuum system for applying vacuum at the support surface to hold the work piece in a fixed position on the support surface when the platens are indexed along the path and during the work steps, the vacuum system including:

a vacuum source, and a plurality of stationary and movable vacuum connectors adapted to provide fluid communication between the vacuum source and the vacuum plenum when the platens are stationary in the work stations during the work steps and when the platens are being indexed between the work stations.

7. An apparatus for sequentially performing a series of work steps on a work piece, said apparatus comprising:

a plurality of work stations arranged in spaced relationship along a linear path, each work station including means for performing one of said work steps on the work piece;

a feed mechanism for indexing a plurality of platens supported on the feed mechanism along the linear path to sequentially position each platen at a respective one of the work stations, each platen defining a support surface for supporting the work piece and a vacuum plenum, the support surface being in fluid communication with the vacuum plenum; and a vacuum system for applying vacuum at the support surface to hold the work piece in a fixed position on the support surface when the platens are indexed along the linear path and during the work steps, the vacuum system including:

a vacuum source, a plurality of first vacuum connectors adapted to provide fluid communication between the vacuum source and the vacuum plenum in the platen during a first period of time, a plurality of second movable vacuum connectors adapted to provide fluid communication between the vacuum source and the vacuum plenum in the platen during a second period of time, and vacuum valve means selectively operable to permit fluid communication between the vacuum source and each plenum through the plurality of first vacuum connectors and the plurality of second vacuum connectors during the first and second periods of time to permit fluid communication between the vacuum source and each plenum through the plurality of connectors as the platens are indexed and as the platens are positioned at the work stations.

8. The apparatus of claim 7, wherein the platen has an upper wall defining the support surface, and a lower wall, the plenum being disposed between the upper and lower walls and comprising an air permeable core, and the upper wall defining a plurality of apertures providing fluid communication from the core to the support surface.

9. The apparatus of claim 8 further comprising a manifold supported on the lower wall and defining first and second vacuum ports each having an associated diaphragm movable between open and closed positions in response to vacuum applied by the vacuum source, one of the first and second ports providing a fluid connection between the vacuum source and the plenum during the first period of time and the other of the first and second ports providing a fluid connection between the vacuum source and the plenum during the second period of time.

10. An apparatus as recited in claim 7 and further including drive means for reciprocating said plurality of first and plurality of second vacuum connectors forward and rearward between said work stations including means for simultaneously moving said plurality of first and said plurality of second vacuum connectors in opposite directions and wherein said first and second periods of time comprise the times of forward reciprocation and said vacuum valve means is adapted to supply vacuum to said plurality of first and said plurality of second vacuum connectors only during said forward reciprocation thereof.

11. An apparatus as recited in claim 7 wherein said plurality of first vacuum connectors are fixed and adapted to provide said fluid communication during the period of time said platens are stationary in said work stations and said plurality of second vacuum connectors reciprocate between work stations and are adapted to provide said fluid communication when said platens are indexing along the path.

12. An apparatus for sequentially performing a series of work steps on a work piece, said apparatus comprising:

a plurality of work stations arranged in spaced relationship along a linear path, each work station including means for performing one of said work steps on the work piece;

a feed mechanism for indexing a plurality of platens supported on the feed mechanism along the linear path to sequentially position each platen at a respective one of the work stations, each platen defining a support surface for supporting the work piece and a vacuum plenum, the support surface being in fluid communication with the vacuum plenum; and a vacuum system for applying vacuum at the support surface to hold the work piece in a fixed position on the support surface when the platens are indexed along the path and during the work steps, the vacuum system including:

a vacuum source, a plurality of first vacuum connectors adapted to provide fluid communication between the vacuum source and the vacuum plenum in the platen during a first period of time, a plurality of second vacuum connectors adapted to provide fluid communication between the vacuum source and the vacuum plenum in the platen during a second period of time, drive means for reciprocating said plurality of first and plurality of second vacuum connectors forward and rearward between said work stations including means for simultaneously moving said plurality of first and said plurality of second vacuum connectors in opposite directions, and vacuum valve means selectively operable to permit fluid communication between the vacuum source and each plenum through the plurality of first vacuum connectors and the plurality of second vacuum connectors during the first and second periods of time to permit fluid communication between the vacuum source and each plenum through the plurality of first vacuum connectors and the plurality of second vacuum connectors as the platens are indexed and as the platens are positioned at the work stations and wherein said first and second periods of time comprise the times of forward reciprocation and said vacuum valve means is adapted to supply vacuum to said plurality of first vacuum connectors and said plurality of second vacuum connectors only during said forward reciprocation thereof.

13. The apparatus of claim 12, wherein the platen has an upper wall defining the support surface, and a lower wall, the plenum being disposed between the upper and lower walls and comprising an air permeable core, and the upper wall defining a plurality of apertures providing fluid communication from the core to the support surface and further comprising a manifold supported on the lower wall and defining first and second vacuum ports each having an associated diaphragm movable between open and closed positions in response to vacuum applied by the vacuum source, one of the first and second ports providing a fluid connection between the first plurality of vacuum connectors and the plenum and the other of the first and second ports providing a fluid connection between the second plurality of vacuum connectors and the plenum.

* * * * *